Jan. 6, 1925.  1,522,123
G. H. HIGGINS
APPARATUS FOR CUTTING A GAP IN PISTON RINGS OR THE LIKE
Filed June 3, 1921   4 Sheets-Sheet 1
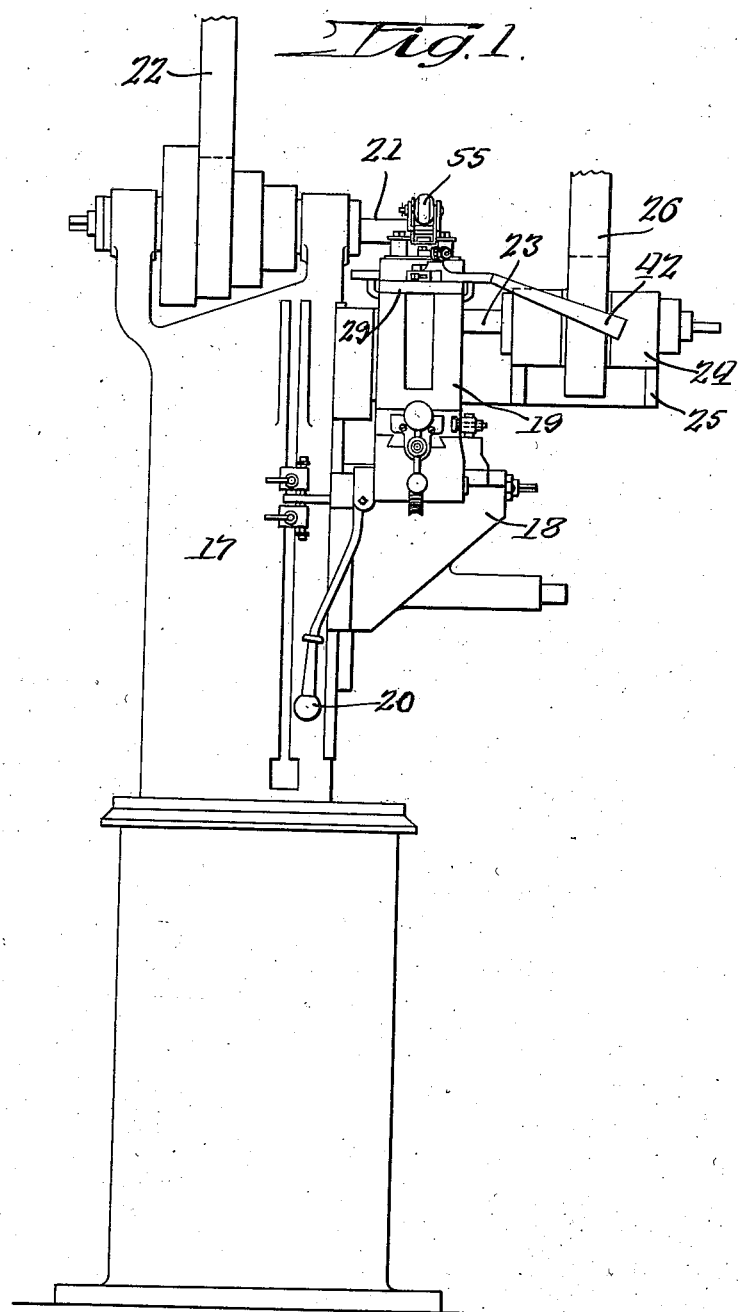

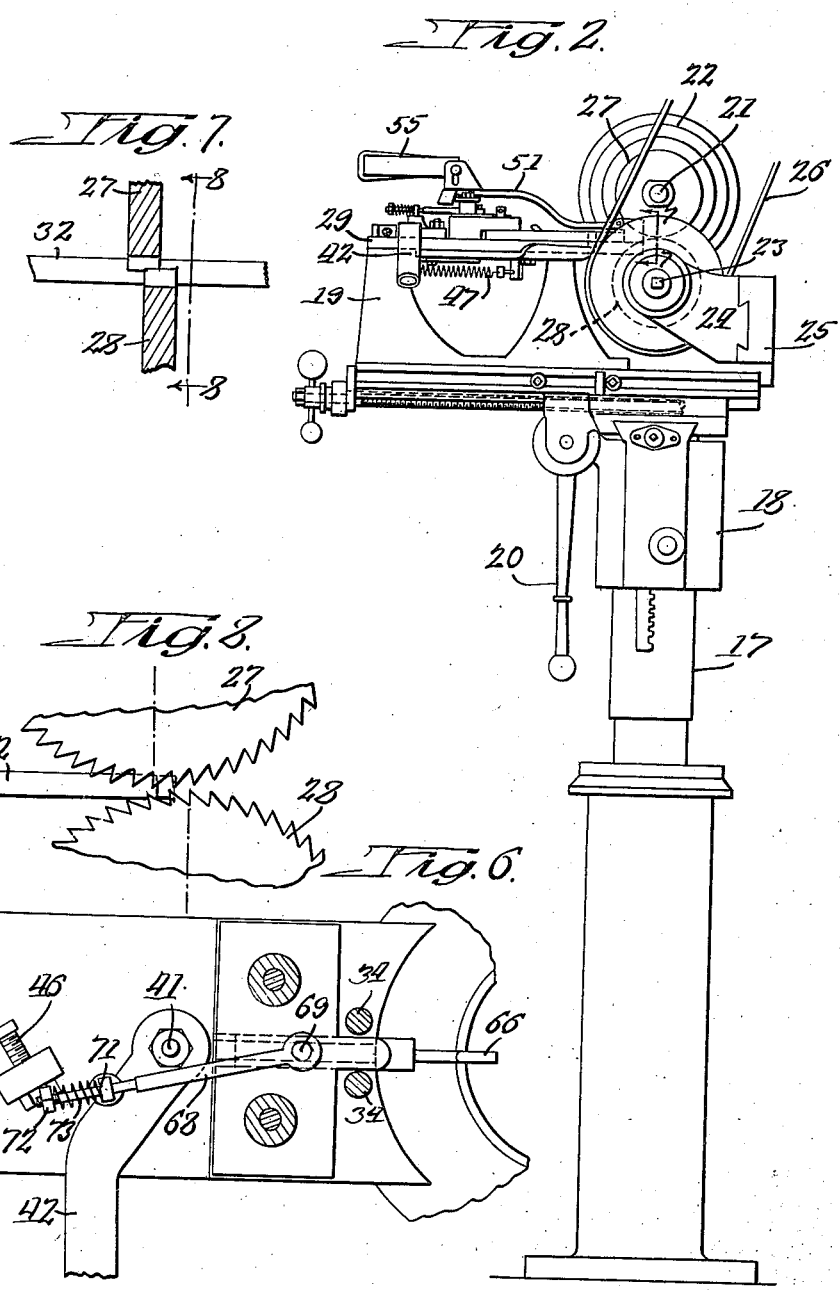

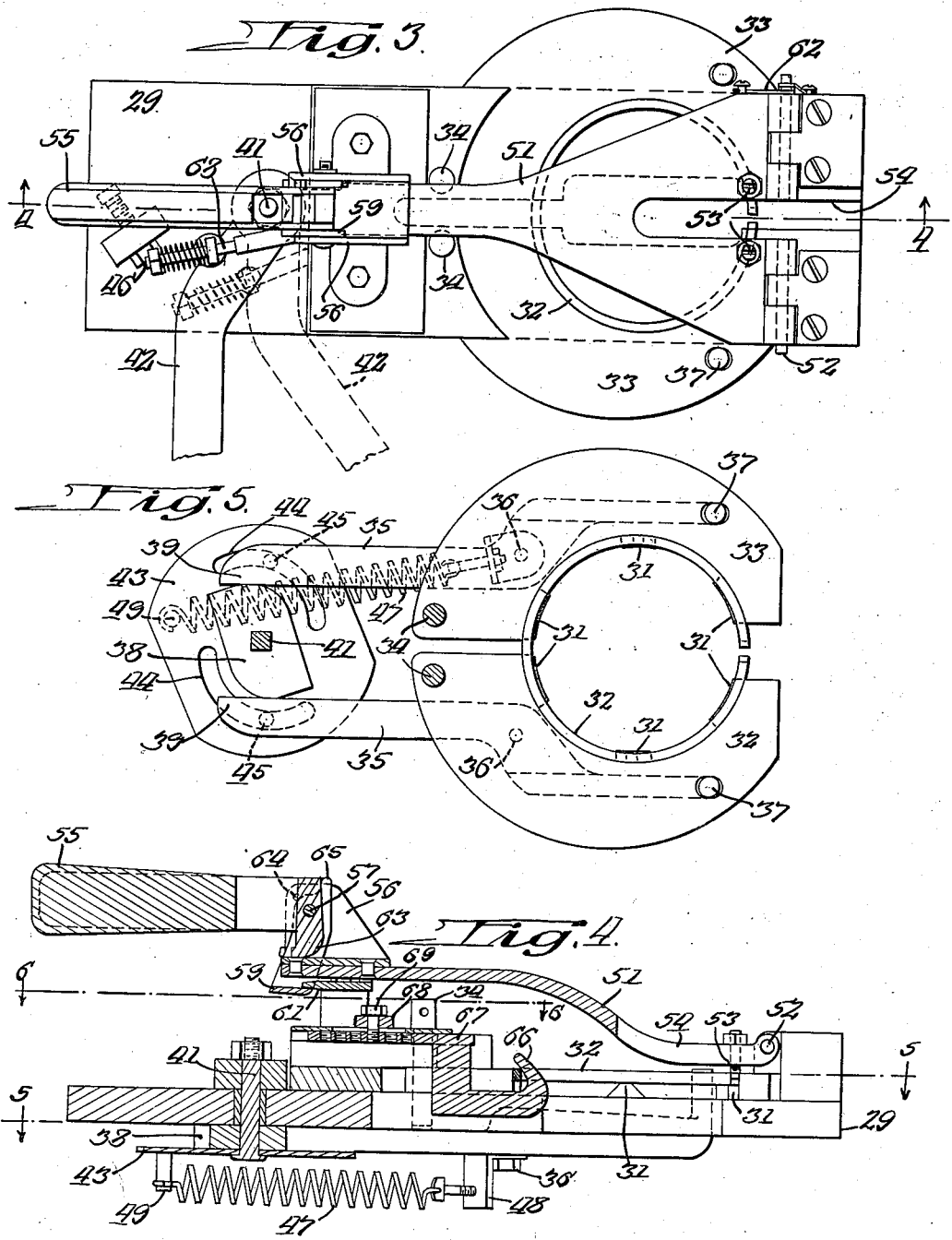

Jan. 6, 1925. 1,522,123
G. H. HIGGINS
APPARATUS FOR CUTTING A GAP IN PISTON RINGS OR THE LIKE
Filed June 3, 1921  4 Sheets-Sheet 4
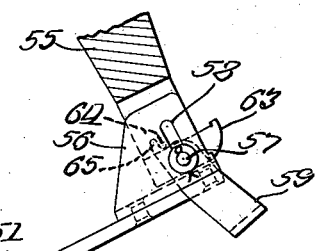
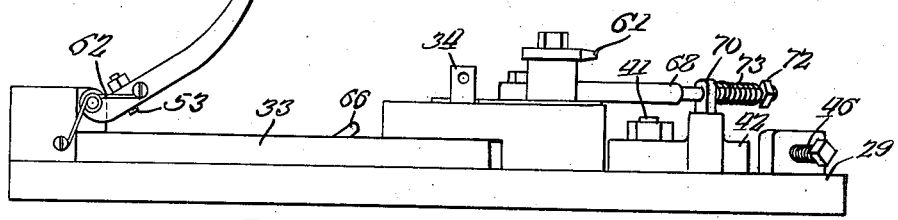
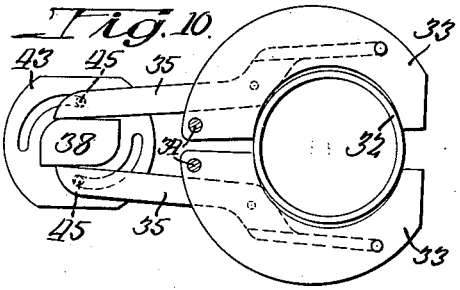
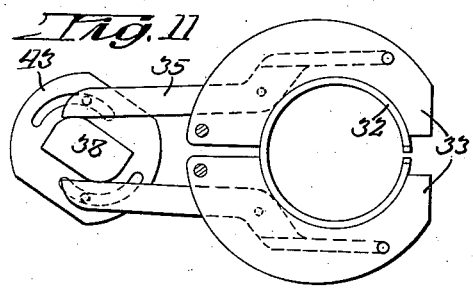
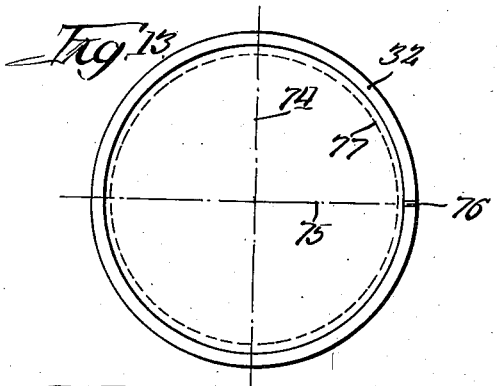
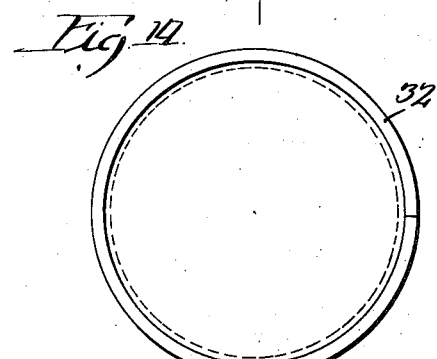

Patented Jan. 6, 1925.

1,522,123

UNITED STATES PATENT OFFICE.

GEORGE H. HIGGINS, OF ROCKFORD, ILLINOIS, ASSIGNOR TO BURD HIGH COMPRESSION RING COMPANY, OF ROCKFORD, ILLINOIS, A CORPORATION OF ILLINOIS.

APPARATUS FOR CUTTING A GAP IN PISTON RINGS OR THE LIKE.

Application filed June 3, 1921. Serial No. 474,776.

*To all whom it may concern:*

Be it known that I, GEORGE H. HIGGINS, a citizen of the United States, residing at Rockford, in the county of Winnebago and State of Illinois, have invented certain new and useful Improvements in Apparatus for Cutting a Gap in Piston Rings or the like, of which the following is a specification.

This invention relates in general to the manufacture of piston rings, and has more particular reference to the cutting of a gap or joint in a ring body.

The primary object is to provide a novel method of and apparatus for cutting a gap or joint in a ring body with the view to obtaining the greatest degree of accuracy possible in the circumferential dimension and the gap of finished rings, and also to obtaining this result in a most practical and economical manner.

More particularly, my invention has reference to cutting a gap in a cast annular ring body, and in obtaining certain dimensional results to within a fine degree of accuracy irrespective of variances, due to conditions impossible to control in casting the ring bodies.

In furtherance of these general objects, I have devised a novel method consisting, briefly stated, in casting a ring body preferably to a non-concentric shape, cutting a gap therein, compressing the ring body to a given circumferential dimension, and recutting or trimming the gap while under such compression. As the result of this method each ring irrespective of variances will be uniform as regards circumferential dimension and ring gap, the degree of uniformity being within a tolerance of several thousandths of an inch.

I have also aimed to provide apparatus of a novel character adapted for most expeditiously and economically cutting a gap in a ring body. In this regard, my invention contemplates the use of one or more milling cutters depending on the shape of the gap, and in the provision of novel means for clamping and holding a ring during the initial cut and for compressing the ring to the proper degree for the trimming cut.

In the present application I have shown as an example illustrating my invention, apparatus for cutting a step-joint gap, and it will be noted that my invention also contemplates the novel arrangement of cutters and driving mechanism for producing a joint of this kind.

Still another object resides in the provision of novel means for clamping and holding a piston ring for presentation thereof to the cutter or cutters.

Other objects and attendant advantages will be appreciated by those familiar with this art as the invention becomes better understood by reference to the following description when considered in connection with the accompanying drawing, in which—

Figure 1 is a front view of a ring-cutting machine embodying my invention;

Fig. 2, a side view of the machine;

Fig. 3, an enlarged top view of the ring holder or fixture;

Fig. 4, a vertical sectional view through the ring holder taken substantially on the line 4—4 of Fig. 3;

Figs. 5 and 6, detail sectional views taken substantially on the lines 5—5 and 6—6 of Fig. 4;

Fig. 7, a detail sectional view taken on the line 7—7 of Fig. 2;

Fig. 8, an enlarged view looking at the cutters as shown in Fig. 2;

Fig. 9, a side view of the ring-holding fixture with the top clamp partly in section;

Figs. 10, 11 and 12, detail views similar to Fig. 5, showing the clamping jaws in three different positions; and Figs. 13 and 14, views of a piston ring before and after cutting the gap.

As mentioned above, I have in illustrating the present invention taken as an example the cutting of a step-joint gap which involves the use of two cutters. It should be understood, however, that my invention is in no way limited to the cutting of this particular joint, but embraces the cutting of any gap or joint in a piston ring body, regardless of the number of cutters employed.

Inasmuch as the cutting is performed by a rotary cutter or cutters, the apparatus employed resembles in a general way a milling machine of a standard type. The well known parts comprise a standard 17, saddle 18 movable vertically on the standard, and a carriage 19 adapted to move horizontally on the saddle by operation of a hand lever 20 or any suitable mechanism. The standard carries the usual cutter spindle 21 which is driven by a belt 22, I have now provided an auxiliary cutter spindle 23 journaled in a bearing bracket 24 adjustably mounted upon a lateral extension 25 rigid with respect to the frame standard 17. The spindle 23 is driven by a belt 26 independently of the spindle 21. The spindles 21 and 23 are equipped with milling cutters 27 and 28 respectively. It will be observed that the spindles are in parallel relation, the spindle 21 above the spindle 22, and as plainly shown in Fig. 7, the cutters are in over-lapping relation, and as shown in Fig. 8 one cutter is set in advance of the other. As the result of this arrangement the cutters produce intersecting cuts providing a step-joint. It follows that by so arranging the cutters, the teeth of one does not interfere with the other, consequently there is no need to provide synchronizing mechanism or any other auxiliary driving mechanism for this purpose.

The fixture for holding a piston ring while the gap is being cut will now be described, reference being had particularly to Figs. 3 to 6 and 9 to 12 inclusive. On the carriage 19 is fixedly secured a base plate 29. This plate carries a plurality of suitable pads 31 upon which a cast piston ring 32 is adapted to be positioned. A pair of lobster jaws 33 are now provided for peripherally clamping the ring, these jaws being pivotally mounted at 34 and adapted to be opened and closed by levers 35. Said levers pivotally mounted on the base intermediate their ends at 36, are connected at one end 37 to their respective jaws and are adapted to be operated at their opposite ends by a cam device for opening and closing the jaws. A cam 38 disposed between the ends 39 of the jaw-operating levers 35, is fixed to a square shaft 41, which is adapted to be oscillated by a hand lever 42, likewise fixed to said shaft. The shaft 41 also carries a plate 43 which has eccentric slots 44 in which are located pins 45 fixed to the levers 35. In the normal released position of the jaws shown in Fig. 10, the lever 42 is in the dotted line position shown in Fig. 3. By swinging the lever in a clockwise direction to the full-line position shown in Fig. 3, the cam 38 will expand the lever end 39, thereby closing the jaws 33 in a powerful compressing action, to the position shown in Fig. 11. The lever 42 may be further moved in a clockwise direction to a position limited by an adjustable stop 46, thereby further closing the jaws to the position shown in Fig. 12. Upon swinging the lever 42 in the reverse direction, the jaws will be opened by the action of the cam slots 44 on the pins 45. A contractile spring 47 connected at one end to a stationary part 48 and at its opposite end 49 to the cam 43, serves by moving beyond center with relation to the shaft 41, to hold the plate 43 and consequently the lever 42 and connected parts in the first and second operative positions, which will be described more fully hereinafter.

An additional clamping means is now provided for holding a ring down on the pad 31 so as to positively insure against displacement of the ring during the cutting operation. This means, best shown in Figs. 4 and 9, consists of a bifurcated clamping lever 51 pivotally mounted at 52 to a part fixed with respect to the base 29 and carrying on each separated end an abutment screw 53 adapted to bear down upon a piston ring seated on the pads 31. It will be noted that the lever 51 is bifurcated, providing an opening 54 for the reception of the cutters and that the abutments 53 engage and hold the piston ring at each side of the gap to be cut. The clamping lever is adapted to be moved into and out of operative position by means of a handle 55 which is disposed between spaced upstanding ears 56 on the lever 51 and carries a pin 57, the projecting ends of which are located in slots 58 in said ears. A U-shaped latch member 59 pivotally mounted on the pin 57, is adapted to engage beneath a part 61 fixed with respect to the base plate, the latch member 59 being movable into and out of engagement beneath said part 61 by swinging the handle 55 on its pivot 57, the connection between the parts 55 and 59 being simply frictional. The lever 51 is normally held in the inoperative position shown in Fig. 9 by a suitable spring 62. The lever may be moved into operative clamping position by grasping the handle 55, swinging said lever downwardly until the abutments 53 strike the piston ring, then swinging the handle 55 in a counter clockwise direction, viewing Fig. 4, thereby engaging the latch member 59 beneath the part 61 and at the same time drawing the lever 51 downwardly in a clamping action by reason of the provision of a cam lug 63 fixed to the handle 55 and operating on the adjacent end of the lever 51. It will be obvious that the outer end of the lever 51 will be drawn downwardly in a clamping action by the cam lug 63, relative movement between the lever 51 and handle 55 being provided by the slots 58. When the handle 55 is swung upwardly in the opposite direction, a pin 64 on said handle will engage the projection 65 on the member 59, thereby withdrawing the latter from the part 61 and permitting the lever 51 to be swung upwardly.

The ring will also be clamped down at a point diametrically opposite from the clamping screws 53 by means of a hook-shaped clamping member 66, Figs. 4 and 6, which is operated by the hand lever 42. The clamping member 66 is suitably mounted on the base to slide in a plane radial with respect to a piston ring, and in the present instance has a slide portion 67 connected by means of a link 68 to the lever 42. The bolt 69 connecting the link 68 to the slide 67 is adjustable to different positions on the latter to accommodate different sizes of rings, and the opposite end of the link 68 is slidable through a pivot eye 71 on the lever 42 and carries a nut 72 and a spring 73 disposed between the nut 72 and pivot eye 71. It follows that when the lever 42 is moved to close the jaws 33, the hooked end 66 will be drawn into clamping engagement with the ring for holding the latter down on the adjacent pads, the spring connection 73 permitting movement of the lever 42 after the clamping member 66 has been drawn to final position. This clamping member will be retracted when the lever 42 is swung back for releasing the lobster jaws.

The novel method of cutting a gap in a piston ring using the above apparatus will now be described. Referring to Fig. 13, it will be observed that the piston ring is not cast in a true circular shape, but instead to an eccentric shape having a major axis 74 and a minor axis 75, the latter intersecting the gate 76 at which a slight notch is formed for ready identification of this point. This ring shape referred to in practice as of pumpkin shape, is obtained by trimming a concentric pattern ring to an oversize, and then bending it to a predetermined elliptical or pumpkin shape, which in the finished ring will give equal wall pressure. A ring cast from such pattern will be shaped substantially as shown in Fig. 13, with respect to a true circle represented by the dotted line 77. If every ring cast from a pattern of this kind was absolutely uniform in all its dimensions, it would only be necessary to cut the gap once and obtain the desired degree of uniformity in dimensions. However, it is found in practice that it is impossible to obtain such desired uniformity in dimensions with the result that there is considerable variance in the diameters of the cast rings as is fully appreciated in this art. I have, therefore, in the present invention devised a method whereby the desired degree of accuracy and uniformity in dimensions of the finished ring will be obtained regardless of such variances.

A cast ring will be positioned in the fixture with its gate 76 disposed centrally between the abutment screws 53, whereupon the handle 55 will be drawn down to clamp the interlocked ring on the pads 31. The hand lever 42 will now be drawn forwardly to the position shown in full lines in Fig. 3, thereby causing the lobster jaws to peripherally clamp and centralize the ring and to securely hold it for the first cutting operation, this position of the jaws being shown in Fig. 11. It being assumed that the cutter 27 is driven in a clockwise direction and the cutter 28 in a counter-clockwise direction, the operator then causes the table 19 to be fed toward the cutters, this being done in the present instance by pulling upwardly on the handle 21. This will feed the gate portion of the ring past the cutters in the relation shown in Figs. 7 and 8, thereby cutting a step-joint gap.

The carriage will now be retracted and the lever 42 drawn forwardly to the limit defined by the stop 46. By this operation the ring will be compressed to a predetermined circumferential dimension and the gap will be closed to a greater or less degree according to the dimensional variances of the particular ring, it being noted that the spring 47 passes beyond the center of the shaft 41 and functions to hold the several parts including the levers 35 in the second operated position. With the ring clamped in this final position, it will be again fed past the cutters, which will trim the gap. The dimensions of the resultant ring, the gap of which has been cut and trimmed in this manner will more closely co-incide with a predetermined standard than is possible to obtain with any prior method of cutting a ring that I have knowledge of. It follows, therefore, that by the use of this novel method, piston rings will be produced to a very fine degree of dimensional accuracy; and this result may be obtained positively and with absolute certainty. It will be noted that the operation is extremely simple and that unskilled help may be employed for operating the apparatus. It will be further noted that the gap to be cut might be of any desired shape and that one or more cutters might be employed, depending on the particular shape.

It is believed that the foregoing conveys a clear understanding of the objects prefaced above, and while I have illustrated but a single working embodiment of my invention, considerable change might be made in the design, construction and arrangement of the apparatus employed in performing the method without departing from the spirit and scope of the invention as expressed in the appended claims, in which—

I claim:

1. Apparatus for cutting a gap in a piston ring comprising means for peripherally clamping a ring, means for cutting a gap therein, said clamping means being operable for contracting the cut ring to a given circumferential dimension, and said cutting means being operable for recutting said gap while the ring is contracted.

2. Apparatus for cutting a gap in a piston ring comprising a pair of lobster jaws adapted for peripherally clamping a piston ring, means for cutting a gap therein, means operable for further closing said jaws, and means for causing said cutting means to recut said gap while the ring is under increased compression.

3. Apparatus for cutting a gap in a piston ring comprising a pair of jaws shaped to peripherally clamp a ring, a cam lever for moving the jaws to clamp an uncut ring, means for cutting a gap in the ring, said lever being operable for further closing the jaws, and means for limiting the closing movement of the jaws whereby to obtain a given circumferential ring dimension, said cutting means being adapted for recutting the gap while the ring is under increased compression.

4. Apparatus for cutting a gap in a piston ring comprising means for peripherally clamping a ring, a bifurcated top clamp engaging the ring at opposite sides of and in proximity to the gap to be cut and for holding the ring down in a fixed position, and cutting means movable between the bifurcated portions of the clamp for cutting a joint in the ring.

5. Apparatus of the character described comprising means for supporting a piston ring, a pair of lobster jaws for peripherally clamping the ring, cam mechanism for moving the jaws in a closing action, and a spring connected with said cam mechanism and arranged to pass a dead center position, whereby to hold the jaws in an operative clamping position when on each side of said center.

6. In apparatus of the character described, the combination of a pair of lobster jaws for peripherally clamping a ring, a lever for operating each jaw, each lever pivotally mounted intermediate its ends and pivotally connected at one end to its jaw, a cam interposed between the opposite ends of the levers for separating the same to thereby close the jaws, and means for operating said cam.

7. In apparatus of the character described, the combination of a pair of jaws for peripherally clamping a piston ring, a cam device for closing and opening the jaws, a lever for moving said cam device, whereby to hold the jaws in an open position and in a plurality of distinct closed positions, and a spring movable past a dead-center position for holding the cam device and jaws in one of said closed positions when on each side of said center.

8. Apparatus for the manufacture of piston rings comprising means adapted to hold a piston ring, means for producing a gap in the ring while so held, means for peripherally compressing the cut ring for contracting it to a predetermined circumferential dimension, and said gap producing means being operable for trimming said gap while the ring is contracted.

9. Apparatus for the manufacture of piston rings comprising means for holding an uncut piston ring and for circumferentially compressing it after a gap has been cut, and means for cutting a gap in the ring before compression and for recutting said gap after compression.

10. Apparatus for the manufacture of piston rings comprising a ring-holding means and a gap-cutting means in permanent alignment and adapted to be relatively moved for cutting a gap in a ring, means for operating said holding means for circumferentially compressing the cut ring to a predetermined dimension and for so holding the ring while said cutting means recuts the gap.

11. Apparatus for the manufacture of piston rings comprising means for producing an opening in a ring including a ring-holding and a cutting means in permanent alignment, means for operating said holding means to compress the ring, whereby the first mentioned means may be operated to remove additional material from the ends of the ring.

12. Apparatus for the manufacture of piston rings comprising a pair of jaws for peripherally clamping a ring, means for producing a gap in the ring and for retrimming the ends of the ring, and means for operating said jaws for holding a ring while said gap is being produced and for circumferentially compressing the ring and holding it while the ends are being trimmed.

GEORGE H. HIGGINS.